United States Patent
Li et al.

(10) Patent No.: US 7,953,164 B2
(45) Date of Patent: May 31, 2011

(54) SYSTEM AND METHOD FOR PERFORMING LS EQUALIZATION ON A SIGNAL IN AN OFDM SYSTEM

(75) Inventors: Wenzhen Li, Singapore (SG); Zhongjun Wang, Singapore (SG); Yanxin Yan, Singapore (SG); Masayuki Tomisawa, Singapore (SG)

(73) Assignee: Oki Techno Centre (Singapore) Pte Ltd., Ocean Building (SG)

( * ) Notice: Subject to any disclaimer, the term of this patent is extended or adjusted under 35 U.S.C. 154(b) by 981 days.

(21) Appl. No.: 11/594,994

(22) Filed: Nov. 9, 2006

(65) Prior Publication Data
US 2007/0116141 A1 May 24, 2007

(30) Foreign Application Priority Data
Nov. 10, 2005 (SG) ................. 200507046-1

(51) Int. Cl.
H04L 27/28 (2006.01)
(52) U.S. Cl. ................. 375/260; 375/316
(58) Field of Classification Search .......... 375/229, 375/260, 316
See application file for complete search history.

(56) References Cited

U.S. PATENT DOCUMENTS

| 7,212,569 | B1 * | 5/2007 | Clark | 375/233 |
| 7,359,311 | B1 * | 4/2008 | Paranjpe et al. | 370/203 |
| 2001/0036235 | A1 | 11/2001 | Kadous | |
| 2005/0058193 | A1 * | 3/2005 | Saed | 375/232 |
| 2005/0281318 | A1 * | 12/2005 | Neugebauer | 375/134 |
| 2005/0286406 | A1 * | 12/2005 | Jeon et al. | 370/208 |
| 2006/0045193 | A1 * | 3/2006 | Stolpman et al. | 375/260 |
| 2006/0222097 | A1 * | 10/2006 | Gupta et al. | 375/260 |

OTHER PUBLICATIONS

Al-Naffouri et al. "A Least /Mean-Squares Approach to Channel Identification And Equalization In OFDM", IEEE (2002), pp. 2577-2580.
Masson et al. "Linear Precoding With Low Complexity MMSE Turbo-Equalization And Application To The Wireless LAN System", IEEE (2005), pp. 2352-2356.
Boumard et al. "Channel Estimation Versus Equalization In An OFDM WLAN System", (2001), IEEE pp. 653-657.

* cited by examiner

Primary Examiner — Shuwang Liu
Assistant Examiner — David Huang
(74) Attorney, Agent, or Firm — Venable LLP; Michael A. Sartori; Kyle D. Petaja (57) ABSTRACT

A system for performing LS equalization on a signal in an OFDM system comprises a receiver stage for receiving a modulated signal, a demodulation stage for demodulating the received modulated signal to produce a demodulated signal, a channel estimation stage for processing the demodulated signal to provide an output signal corresponding to a channel frequency response and an equalization stage arranged to process the output signal from the channel estimation stage to produce a channel state information signal. The equalization stage is arranged to use the channel state information signal to operate on the demodulated signal from the demodulation stage to produce an equalized demodulated output signal. There is also disclosed a method for performing LS equalization on a signal in an OFDM system.

10 Claims, 4 Drawing Sheets

SYSTEM AND METHOD FOR PERFORMING LS EQUALIZATION ON A SIGNAL IN AN OFDM SYSTEM

FIELD OF THE INVENTION

The present invention relates to a system and method for performing least square (LS) equalization on a signal in an OFDM system and finds particular use in a receiver in an Ultra-wideband (UWB) wireless personal area network (WPAN) with coded OFDM modulation.

BACKGROUND OF THE INVENTION

Ultra-wideband (UWB) technology is a short-range radio technology which is ideal for use in wireless personal area networks (WPANs). UWB technology provides data transfer rates of up to 480 MHz at a distance of 2-3 meters in realistic multipath environments whilst consuming very little power. Systems embodying UWB technology may be produced in a very compact form.

The UWB industry promoter, the MultiBand OFDM Aliance (MBOA) is developing specifications for a UWB solution using multiband OFDM for the physical (PHY) layer and the media access controller (MAC) layer and the interface inbetween for a diverse set of applications, such as real-time wireless video transmission, cable replacement (e.g. USB, 1394), direct print from digital cameras, wireless digital projectors, wearable computing, and wireless Desktops.

One approach for implementing UWB technology is the multi-band Orthogonal Frequency Division Multiplexing (MB-OFDM) technique. In this technique, the UWB signals for communications applications are specified to have a minimum bandwidth of 500 MHz within the 3.1 GHz to 10.6 GHz spectrum.

There are a number of problems in UWB system development, including extremely high bandwidth requirements (up to 500 MHz) and very low transmission power. These lead to a very hostile propagation environment with serious multipath fading and noise likely in conventional systems. Therefore, complicated signal processing is generally required to achieve successful data transfer.

In OFDM systems, the available spectrum is conventionally divided into a number of sub-carriers. By making all sub-subcarriers narrow band, they experience flat fading, which makes the equalization very simple. However, in the presence of strong echoes, some carriers will suffer deep fades, due to the destructive combination of the various reflections, while others will be enhanced by constructive addition. Coding and interleaving applied to OFDM may be used to average the local fadings over the whole signal bandwidth and over the time interleaving depth.

In a coded OFDM (COFDM) system, the received signal is noisier when it fades than it is when it is enhanced. This inequality in signal power will decrease the performance of, for example, a Viterbi decoder due to the reliability of received data differing from subcarrier to subcarrier. Therefore, it is necessary to estimate dynamically the data reliability in each subcarrier position. To attain close-to-optimal decoding performance, any coded OFDM system must rely on the use of channel state information (CSI) in a soft decision.

Several methods of using the CSI in a Viterbi decoder are known and a number of such conventional techniques and systems are described in the following documents:

"Performance analysis of Viterbi Decoder using channel state information in COFDM system" by Weon-cheol Lee, Hyung-Mo park, Kyung-jin Kang and Kuen-bae kim, published as IEEE Transactions on Broadcasting, Vol.44, No.4, December, 1998, pp 488-496; "A soft decision decoding scheme for wireless COFDM with application to DVB-T" by Yong Wang, Jinhua Ge, Bo Al, Pei Liu, ShiYong Yang published as IEEE Transactions on Consumer Electronics, Vol.50, No.1, February, 2004, pp 84-88; "A demapping Method Using the Pilots in COFDM systems" by Min-Young-Park and Weon-Cheol Lee, published as IEEE Trans. On Consumer Electronics, Vol.44. No.3, August.1998, pp. 1150-1153 and "Use of Linear Transverse Equalisers and channel state information in combined OFDM-equalization" by Simon Armour, Andrew Nix, David Bull published as IEEE proceeding, 2000, pp 615-619.

A popular method of calculating and utilizing CSI is proposed in Weon-cheol Lee, Hyung-Mo park, Kyung-jin Kang and Kuen-bae kim, "Performance analysis of Viterbi Decoder using channel state information in COFDM system." IEEE Transactions on Broadcasting, Vol.44, No.4, December, 1998, pp 488-496. There are a number of problems with the method disclosed therein, firstly, the CSI generation and the corresponding post processing are highly complex. Secondly, when a bit interleaver is adopted in such as system, the accuracy of the CSI cannot be maintained for each bit. The reason for this is that two bits of one modulation symbol (with the same CSI) are deinterleaved, whereas, the bits which contribute to the new branch metric by using the same CSI do not in fact have the same CSI. The number of such bits depends on the coding rate R. Thus, in this case, only the average CSI can be used according to the bit deinterleaver rule. However, using the average value of the CSI in the Viterbi decoder does not give the best results.

In the publications by Yong Wang, Jinhua Ge, Bo Al, Pei Liu, ShiYong Yang entitled "A soft decision decoding scheme for wireless COFDM with application to DVB-T" (published as IEEE Transactions on Consumer Electronics, Vol.50, No.1, February, 2004, pp 84-88) and by Min-Young Park and Weon-Cheol Lee entitled "A demapping Method Using the Pilots in COFDM systems" (published as IEEE Trans. On Consumer Electronics, Vol.44. No.3, August. 1998, pp. 1150-1153) a CSI utilization method is disclosed. In this scheme, the overall data reliability is obtained by multiplying the CSI with the decision value from a demapper and this multiplied value is applied to the Viterbi decoder. In this case, the implication of the bit interleaver is clarified and full use is made of the CSI. However, this method requires a separate CSI generator and a combined reliability generator, which is costly and equalization achieved by this method remains complex.

Thus, there is a need for a method in which full use is made of the CSI whilst achieving improved system performance and which has a much lower complexity than a conventional minimum mean square error (MMSE) equalizer and a conventional least square (LS) equalizer.

SUMMARY OF THE INVENTION

In general, the present invention is directed to a system and method for performing least square (LS) equalization on a signal in an OFDM system in which an equalization stage is arranged to process the output signal from a channel estimation stage to produce a channel state information signal, the equalization stage being arranged to use the channel state information signal to operate on a demodulated signal output from a demodulation stage to produce an equalized demodulated output signal.

In particular, according to a first aspect of the present invention there is provided a system for performing least square (LS) equalization on a signal in an OFDM system comprising:

a receiver stage for receiving a modulated signal;
a demodulation stage for demodulating the received modulated signal to produce a demodulated signal;
a channel estimation stage for processing the demodulated signal to provide an output signal corresponding to a channel frequency response; and
an equalization stage arranged to process the output signal from the channel estimation stage to produce a channel state information (CSI) signal, the equalization stage being arranged to use the channel state information signal to operate on the demodulated signal from the demodulation stage to produce an equalized demodulated output signal.

Preferably, the system further comprises one or more of, for example, a de-mapper stage for demapping the equalized output signal, and a decoding chain for decoding the equalized demodulated output signal. The decoding chain may comprise a Viterbi decoder.

In the preferred embodiment in which one or more of a demapper stage and a decoding chain are included, preferably one or more of the demapper stage and the decoding chain has a linear response.

The demodulation stage may comprise a Fast Fourier Transform (FFT) stage.

In one preferred embodiment, the equalization stage is arranged to operate on the demodulated signal using channel state information derived from the square of the channel frequency response corresponding to the power of the channel frequency response.

In another preferred embodiment, the equalization stage is arranged to operate on the demodulated signal using channel state information derived from the amplitude of the channel frequency response.

According to a second aspect of the present invention there is provided a receiver comprising the above-defined system.

According to a third aspect of the present invention there is provided a transceiver comprising the above-defined system.

According to a fourth aspect of the present invention there is provided a method for performing least square (LS) equalization on a signal in an OFDM system comprising:

receiving a modulated signal;
demodulating the received modulated signal to produce a demodulated signal;
processing in a channel estimation stage the demodulated signal to provide an output signal corresponding to a channel frequency response;
processing in an equalization stage the output signal from the channel estimation stage to produce a channel state information signal;
operating on the demodulated signal in the equalization stage using the channel state information (CSI) signal to produce an equalized demodulated output signal.

Preferably, the method further comprises demapping the equalized output signal using, for example, a de-mapper stage having a linear response.

In a further preferred embodiment the method further comprises decoding the output signal, for example using a Viterbi decoder.

In a preferred embodiment, the step of decoding comprises decoding in a decoding chain having a linear response.

Preferably, the step of demodulating comprises demodulating in a demodulating stage comprising a Fast Fourier Transform stage.

In a first preferred embodiment, the step of equalizing comprises operating on the demodulated signal using channel state information derived from the square of the channel frequency response corresponding to the power of the channel frequency response.

In a further preferred embodiment, the step of equalizing comprises operating on the demodulated signal using channel state information derived from the amplitude of the channel frequency response.

This, in a preferred embodiment, the power of the channel frequency response (CFR) is used as the CSI for each sub-carrier, which substantially simplifies the implementation. Preferred a conventional soft decision Viterbi decoder is adopted, where the branch metric calculation is based on the simplified Euclidean distance. The obtained CSI is integrated with LS equalization to obtain the combined reliability for each sub-carrier from the equalized data.

Thus, in preferred embodiments of the present invention, channel state information (CSI) is utilized independently from the architecture of the decoding chain to achieve the maximum CSI gain, by integrating the CSI utilization into the least square (LS) equalization. One or more preferred embodiments make full use of the CSI.

Furthermore, one or more preferred embodiments not only improve or at least do not degrade the system performance, but also substantially decrease the complexity and costs of the LS equalization process when compared to conventional minimum mean square error (MMSE) equalization and LS equalization systems and methods.

BRIEF DESCRIPTION OF THE DRAWINGS

The present invention will now be described by way of example and with reference to the accompanying drawings in which.

DETAILED DESCRIPTION OF PREFERRED EMBODIMENTS

Figure 1:
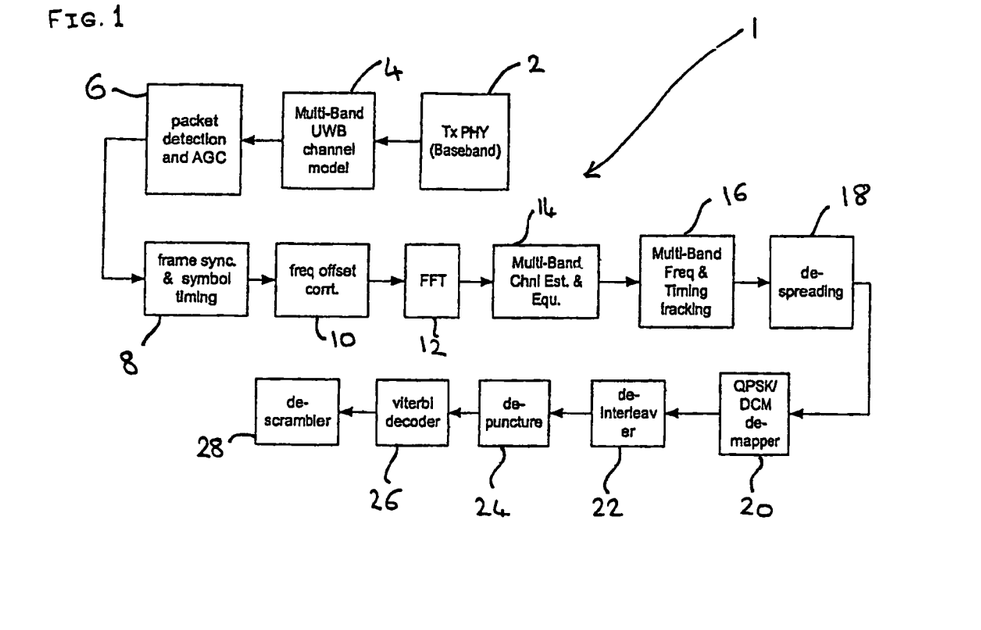
FIG. 1 is a schematic block diagram of a conventional baseband transceiver architecture for a multi-band orthogonal frequency division multiplexing (MB-OFDM) system.

The baseband function blocks of a conventional MB-OFDM transceiver system 1 following the MB-OFDM standard is shown in FIG. 1. The system 1 comprises a transmitter 2, a multiband UWB fading channel model 4, and a receiver chain. The receiver chain comprises a packet detection and automatic gain control (AGC) stage 6, a frame sync and symbol timing stage 8, a frequency offset control stage 10, a Fast Fourier Transform demodulator stage 12, a multiband channel estimator and equalization stage 14, a multiband frequency and timing tracking stage 16, a despreader 18, a QPSK/DCM de-mapper 20, a de-interleaver 22, a de-puncturer 24, a Viterbi decoder 26 and a descrambler 28.

In operation, a signal is transmitted from the transmitter 2, through the multiband UWB fading channel model 4 to the packet detection and AGC stage 6 of the receiver. In the packet detection and AGC stage 6, the data packets in the transmitted signal are detected and the gain of the stage 6 is automatically adjusted if necessary to provide a standard output signal level. The detected packets are passed to the frame sync and symbol timing stage 8. The signal output from this stage 8 is applied to the frequency offset control stage 10 where the frequency of a local oscillator is adjusted to match the frequency of the incoming signal. The output of this stage 10 is then applied to the Fast Fourier Transform demodulator stage 12 where the signal modulation is recovered. The demodulated signal output from the stage 12 is passed to the multiband channel estimator and equalization stage 14 where the signal channel is estimated and the signal is equalized. The equalized signal is applied to the multiband frequency and timing tracking stage 16, and then to the despreader 18. The output signal from the despreader 18 is applied to the QPSK/DCM de-mapper 20, then to the de-interleaver 22, the de-puncturer 24, the Viterbi decoder 26 and the descrambler 28, in sequence.

In MB-OFDM, the UWB spectrum is divided into several 528 MHz bands, and information is transmitted using OFDM modulation on each band. According to the MBOA specification and as set out in the publication by J. Foerster and Intel R&D entitled "Channel Modeling Sub-committee Report Final (doc.: IEEE P802.15-02/490r1-SG3a)," [published as IEEE P802.15 Working Group for Wireless Personal Area Networks (WPANs), February, 2003 which is available at: http://grouper.ieee.org/groups/802/15/pub/2003/February03/], OFDM carriers are generated using a 128-point IFFT/FFT, and the internal precision is reduced by limiting the constellation size to QPSK. Moreover, information bits are interleaved across all bands to exploit frequency diversity and to provide protection against multi-path fading and interference. There are 165 data samples within one OFDM system, including 32 zero-padding samples (60.6 ns) as a guard interval to provide robustness against multi-path fading, and 5 zero-padding samples (9.5 ns) as a guard interval to provide sufficient time for switching between bands.

An OFDM signal with a cyclic prefix is created by pre-appending the samples of IFFT output, and a ZP-OFDM signal is created by pre-appending zeros to the IFFT output. In an MB-OFDM system, such as that shown in FIG. 1, ZP (zero-padding)-OFDM modulation is conventionally adopted. A ZP-OFDM signal has a smoother power spectral density (PSD) as there are no ripples in its PSD. Hence a ZP-OFDM system does not need any back-off at the transmitter. This is set out in the publication by the MBOA entitled "Multi-band OFDM Physical Layer Proposal Response to no Voters (doc.: IEEE P802.15-03/343r1)" [published as IEEE P802.15 Working Group for Wireless Personal Area Networks (WPANs), Sep. 2003 which is available at: http://grouper.ieee.org/groups/802/1 5/pub/2003/Sep03/]. Compared to a CP-OFDM system, a similar frequency domain channel estimation and equalization may be applied with a minor modification, for example by using an overlap and add (OLA) algorithm for ZP-OFDM systems instead of the overlap and saving (OLS) algorithm used for CP-OFDM systems. Moreover, a ZP-OFDM system may achieve the same performance as a CP-OFDM system over a multipath fading channel. This is set out in the publication by A. Muquet, Z. Wang, G. B. Giannakis, M. D. Courville, and P. Duhamel, entitled "Cyclic prefixing or zero padding for wireless multicarrier transmissions?" published as IEEE Transactions on Communications, Vol. 50, No. 12, December 2002, pp. 2136-2148.

In an MB-OFDM receiver 2 such as that shown in FIG. 1, the frame and symbol timing synchronization are established first in the frame sync and symbol timing stage 8, and 128 samples are extracted from the 165 samples in each OFDM symbol. In the multiband channel estimator and equalization stage 14, the channel estimation operates on the preamble of channel estimation sequences after FFT demodulation in the Fast Fourier Transform demodulator stage 12. Channel estimation using preamble is widely used in conventional systems and a number of solutions for handling a serious fading and noisy channel have been proposed for practical applications and examples of these are set out in the publication by Ove Edfors, Magnus Sandell, Jan-Jaap van de Beck, Sarah Kate Wilson, and Per Ola Borjesson, entitled "OFDM Channel Estimation by Singular Value Decomposition" published as IEEE Transaction on Communications, Vol.46, No.7, July 1998, pp 931-939, and the publication by Qihong Ge, Jianhua Lu, and Shunliang Mei entitled "A Noise-Resilient Equalization Algorithm for OFDM Systems" and published as IEEE Proceedings of the 5th International Symposium on Wireless Personal Multimedia Communications,2002, vol.3, ppl 314-1317.

After demodulation and equalization, the demodulated signal is applied to the decoding chain comprising the de-interleaver 22, the de-puncturer 24, the Viterbi decoder 26 and the descrambler 28.

Figure 2:
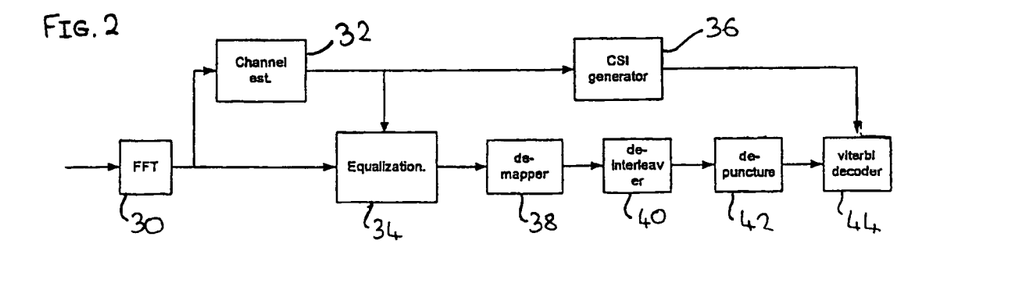
FIG. 2 is a schematic block diagram of a first conventional CSI-aided Viterbi decoder.
Figure 3:
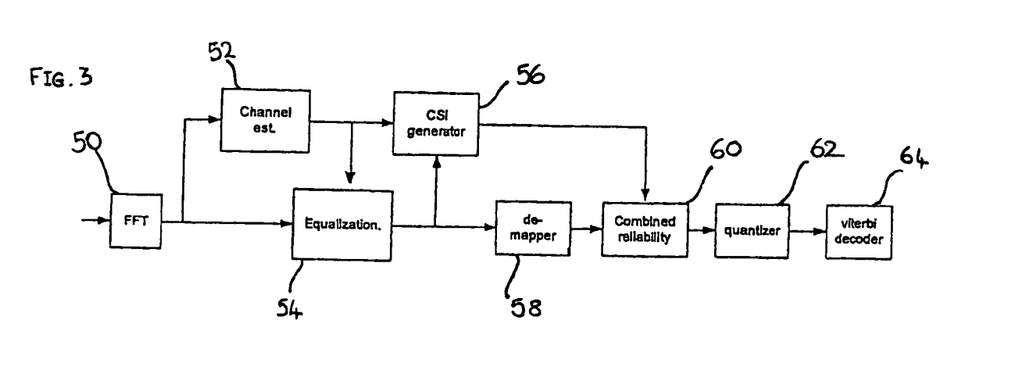
FIG. 3 is a schematic block diagram of a second conventional CSI-aided Viterbi decoder.

The performance of systems such as that shown in FIG. 1 may be improved by employing a CSI-aided Viterbi decoder and two examples of conventional CSI-aided Viterbi decoders are shown in FIGS. 2 and 3. FIG. 2 shows a block schematic of a first conventional CSI-aided Viterbi decoder comprising a FFT demodulator 30, the output of which is applied to a channel estimation stage 32 and an equalization stage 34. The output of the channel estimation stage 32 is applied to a CSI generator stage 36 and to a further input of the equalization stage 34. The output of the equalization stage passes through a de-mapper stage 38, a de-interleaver stage 40, and a de-puncturer stage 42 to a Viterbi decoder stage 44. The output of the CSI generator stage 36 is passed to a further input of the Viterbi decoder stage 44.

In the first scheme proposed in the publication by Weoncheol Lee, Hyung-Mo park, Kyung-jin Kang and Kuen-bae kim, entitled "Performance analysis of Viterbi Decoder using channel state information in COFDM system" and published as IEEE Transactions on Broadcasting, Vol.44, No.4, December, 1998, pp 488-496, the system for which is shown in FIG. 2, the CSI is obtained from the estimated signal power and noise power. The signal power is estimated in the channel estimation stage 32, and the noise power is estimated from all pilot carrier positions in the frequency domain equalizer of the equalization stage 34. The CSI is then obtained by dividing the estimated signal power by the estimated noise power.

The equalized symbols pass through the demapper stage 38, the de-interleaver stage 40 and the de-puncturer stage 42 and are then transferred to the Viterbi decoder stage 44 for soft decision decoding. The estimated CSI is also transferred to the Viterbi decoder stage 44. After calculating the Euclidean distance for the soft decision decoding, the Euclidean distance of the branch metric is multiplied by the CSI. Thus, new branch metric values that consider CSI are obtained.

A second conventional CSI-aided Viterbi decoder is shown in FIG. 3 as comprising an FFT demodulator 50, the output of which is applied to a channel estimation stage 52 and an equalization stage 54. The output of the channel estimation stage 52 is applied to a CSI generator stage 56 and to a further input of the equalization stage 54. The output of the equalization stage 54 is applied to another input of the CSI generator stage 56 and to a de-mapper stage 58. The output of the de-mapper stage 58 is applied to one input of a combined reality stage 60. The output of the CSI generator stage 56 is applied to a further input of the combined reality stage 60. The output of the combined reality stage 60 is applied, via a quantizer stage 62 to a Viterbi decoder stage 64.

In the system of FIG. 3, the CSI is generated from the outputs of the channel estimation stage 52 and the equalization stage 54. The output of the de-mapper stage 58 forms the soft bit decision value, which is directly related to the signal reliability. The overall data reliability signal is obtained by multiplying the CSI with the soft bit decision value. The overall data reliability signal is applied to the input of the Viterbi decoder stage 64 through the quantizer stage 62. In this case, full use is made of the CSI and in the Viterbi decoder stage 64, the Euclidean distance of the branch metric varies adaptively in accordance with the CSI in each subcarrier.

In conventional CSI-aided Viterbi algorithms, the equalized data and the estimated CSI are both transferred through the decoding chain to a branch metric calculation block that decides the Euclidean distance for soft decision decoding. The system complexity increases with the nature of the CSI information carried to the Viterbi decoder.

Figure 4:
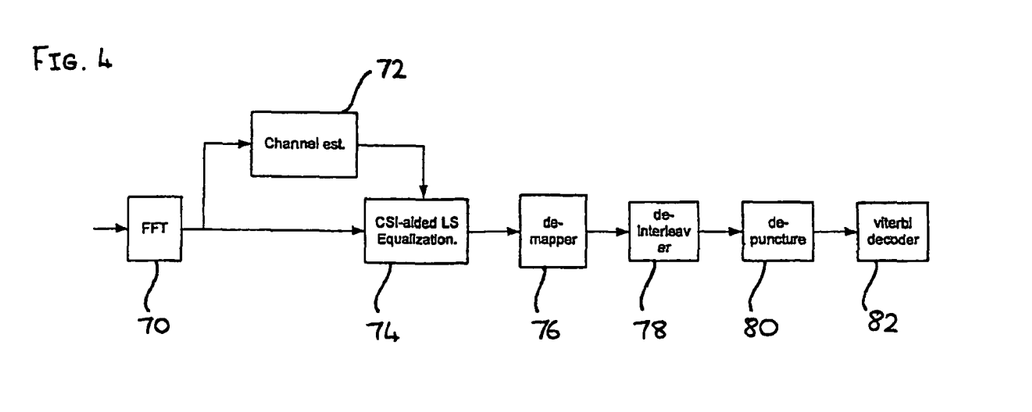
FIG. 4 is a schematic block diagram of a CSI-aided LS equalizer according to a first preferred embodiment of the present invention.

A CSI-aided LS equalizer system according to a first preferred embodiment of the invention is shown in FIG. 4 as comprising an FFT demodulator 70, the output of which is applied to a channel estimation stage 72 and to a first input of a CSI-aided LS equalization stage 74. The output of the channel estimation stage 72 is applied to another input of the CSI-aided LS equalization stage 74, the output of which is applied via a de-mapper stage 76, a de-interleaver stage 78 and a de-puncturer stage 80 to the input of a Viterbi decoder stage 82. The de-mapper stage 76 may include, for example, a QPSK/BPSK demapper. In this embodiment, the squared value of the channel estimates determined in the channel estimation stage 72 is utilized as the CSI. The CSI may be employed in the equalization stage 74 to simplify the complexity of the LS equalizer, whilst achieving an improvement in performance as the Viterbi decoder is-making full use of CSI.

In this embodiment, the equalization and CSI aided Viterbi decoder have a very simple and direct implementation format, that is, the CSI utilization is independent of the decoding chain which comprises the de-mapper, the de-interleaver, the de-puncturer and the Viterbi decoder. Thus the costs of CSI estimation and utilization in conventional CSI-aided Viterbi decoders are avoided, and the complexity of a conventional LS equalizer is also decreased by replacing the complex dividers with a complex multiplier.

The equalization methods for use in the systems of FIGS. 1 to 4 will now be described. There are two popular conventional equalization methods for OFDM systems, the Least Square (LS) equalization method (as used in connection with the system of FIG. 2) and the MMSE equalization method (as used in connection with the system of FIG. 3). These two methods may be considered to be equivalent in a noise free environment, but the former solution is less complex and the latter is more noise robust.

For simplicity of the following analysis, it is assumed that the channel frequency response is known in the receiver and the channel estimation error is insignificant as an accurate channel estimate may be obtained using preamble sequences, as described in the publication by Ove Edfors, Magnus Sandell, Jan-Jaap van de Beck, Sarah Kate Wilson, and Per Ola Borjesson entitled "OFDM Channel Estimation by Singular Value Decomposition" and published as IEEE Transaction on Communications, Vol.46, No.7, July 1998, pp 931-939.

In systems such as those shown in FIGS. 1 to 3 and also in that according to a first preferred embodiment of the present invention as shown in FIG. 4, it may be assumed that $A_m(k)$, $R_m(k)$ and $H_m(k)$ represent the kth subcarrier of an mth OFDM symbol for the estimated transmitted signal, received signal, and the channel frequency response (CFR) respectively.

In a conventional LS frequency multipath equalization method, the equalized data at the output of the frequency domain equalizer (FEQ) may be given directly by $$\hat{A}_m(k) = \frac{R_m(k)}{H_m(k)} \qquad (1)$$

Alternatively, in a conventional MMSE equalization method, the transmitted data samples may be estimated by $$\hat{A}_m(k) = \frac{R_m(k) H_m^*(k)}{|H_m(k)|^2 + \frac{N_o}{2}} \qquad (2)$$

where $(.)^*$ represents the conjugate operation, and $N_0 = 2\theta^2$ is the variance of the noise, which is assumed to be the same for the whole bandwidth.

In a Viterbi decoder, the most probable path is selected through the trellis searching upon observing the received data sequence $Y_N = [y_1, y_2, \ldots y_n]^T$. The maximal likelihood (ML) principle is applied on the trellis searching, namely the maximal joint probability density function (PDF) $f(Y_N|I_N)$ is obtained, where $I_N = [I_1, I_2, \ldots, I_N]^T$ is transmitted data. When the additive noise is zero-mean Gaussian, $f(Y_N|I_N)$ is a multivariate Gaussian PDF, that is, $$f(y_N|I_N) = \frac{1}{(2\pi\Delta C)^{N/2}} \exp\left[-\frac{1}{2}(Y_N - B_N)^T C^{-1} (Y_N - B_N)\right] \qquad (3)$$

where $B_N = [B_1, B_2, \ldots, B_N]^T$ is the mean of the vector $Y_N$, C is the N×N covariance matrix of $Y_N$, $(\ )_T$ denotes the transpose of the matrix and $C^{-1}$ is the reverse matrix of C.

The computation for finding the most probable sequence through the trellis may be simplified as follows (as discussed in the publication by John. G. Proakis, entitled "Digital Communications", Third Edition, McGRAW Hill International Editions), $$\hat{I}_N = \arg_{I_N} \min \left[ \sum_{m,i} (y_{m,i} - I_{m,i})^2 \right] \qquad (4)$$

$$= \arg_{I_N} \min \left[ \sum_{m,i} (y_{m,i}^2 + I_{m,i}^2) - 2\sum_{m,k} y_{m,i} I_{m,i} \right]$$

The metric employed here is the squared Euclidean distance between the soft received sequence and the trellis paths. $I_{m,i}$ is the bit value of the mth branch ith bit in the correct path, which takes the value±1, and $Y_{m,i}$ is the soft decision input value to the Viterbi decoder.

Neglecting the terms that are common to all branch metrics, the branch metric may be further simplified as, $$M_s = \sum_{m,i} -y_{m,i} I_{m,i} \qquad (5)$$

As disclosed in the publication by Weon-cheol Lee, Hyung-Mo park, Kyung-jin Kang and Kuen-bae kim entitled "Performance analysis of Viterbi Decoder using channel state information in COFDM system." Published as IEEE Transactions on Broadcasting, Vol.44, No.4, December, 1998, pp 488-496, CSI is utilized to update the branch metric as follows, $$M_s = \sum_{m,i} CSI_m (y_{m,i} - I_{m,i})^2 \qquad (6)$$

However, this conventional scheme can not make full use of the CSI as the bits $Y_{m,o} \sim Y_{m,k}$ (where k is related to the coding rate) using the same $CSI_m$ for the metric calculation come from different subcarriers associated with different CSIs, and these are then reorganized by the demapper and bit deinterleaver.

When a simplified branch metric is adopted which is a linear function of the input $Y_{m,k}$, the CSI may be combined with the decoder input and utilized as, $$M_s = \sum_{m,i} -CSI_{m,i} y_{m,i} I_{m,i} = \sum_{m,i} -y'_{m,i} I_{m,i} \qquad (7)$$

Here, $CSI_{m,i}$ is the reliability value for the soft bit decision $y_{m,i}$.

Through analysis, the functions of the whole decoding chain (comprising the Viterbi branch metric, the de-interleaver, and the de-puncturer) also possess the property of the linearity. This feature is utilized in the conventional methods described in the publication by Yong Wang, Jinhua Ge, Bo Al, Pei Liu, ShiYong Yang entitled "A soft decision decoding scheme for wireless COFDM with application to DVB-T." published as IEEE Transactions on Consumer Electronics, Vol.50, No.1, February, 2004, pp 84-88 and in the publication by Min-Young Park and Weon-Cheol Lee entitled "A demapping Method Using the Pilots in COFDM systems," published as IEEE Trans. On Consumer Electronics, Vol.44. No.3, August. 1998, pp. 1150-1153. In these conventional schemes, the de-mapper output soft decision is the signed reliability of the corresponding received bit, then the CSI for each bit may also be obtained and its multiplication with the soft decision is treated as the input of the decoding chain. This method makes full use of the CSI and the decoding chain does not need any modification to accommodate the CSI signal.

According to a preferred embodiment of the present invention, the function of the QPSK demapper is denoted as M(·), whose output soft reliability may be rewritten as:

$$M(\hat{A}_m(k)) = \{Re(\hat{A}_m(k)), Im(\hat{A}_m(k))\} \qquad (8)$$

Thus, the function of the QPSK demapper is also a linear function of its input $\hat{A}_m(k)$. The same channel state information for the k th subcarrier $CSI_k$ is applicable for two outputs of the demapper. Thus, the output is the CSI updated branch metric, $$CSI_k * M(\hat{A}_m(k)) = M(CSI_k * \hat{A}_m(k)) \qquad (9)$$

From the above equations (8) and (9) a CSI aided LS equalization method may be derived as set out below.

The signal/noise ratio (SNR) may be used as the CSI for the Viterbi decoder. The measure of SNR for the individual sub-bands (and hence the reliability of the corresponding data) is determined from $$SNR_m(k) = \frac{|H_m(k)|^2}{N_o f_{sb}} \qquad (10)$$

where $f_{sb}$ is the sub-carrier bandwidth. In practice, the noise spectral density is unknown. However, the reliability of each sub-band is proportional to the magnitude of the corresponding element $H_m(k)$ thus, $$CSI_m(k) \sim |H_m(k)|^2 \qquad (11)$$

Employing LS equalization and replacing Equation (9) with Equation (11), the output of the equalization stage may be denoted by $$CSI_k \hat{A}_m(k) = |H_m(k)|^2 \frac{R_m(k)}{H_m(k)} = R_m(k) H_m^*(k) \qquad (12)$$

The scheme according to a first preferred embodiment of the present invention integrates the equalization and CSI aided Viterbi decoder into a very simple and direct implementation format for use as an LS equalizer for a CODFM system which is more economic and less complex than conventional LS equalizers as the complex dividers of conventional systems are replaced with a complex multiplier, and the corresponding normalizer designed is also simplified. The scheme according to a first preferred embodiment of the present invention also substantially improves the system performance.

The CSI-aided LS equalization method according to a first preferred embodiment of the invention is derived from the special linearity in the BPSK/QPSK demapper. Other linear modulation schemes, such as dual carrier modulation (DCM) which is also a valid modulation scheme in MB-OFDM based UWB systems, do not have this special linearity in the demapper. In view of this, it is possible that the above proposed scheme may not be suitable for use in other modulation schemes. Thus, according to a second preferred embodiment, a further solution has been developed, which is applicable to all kinds of modulation schemes. This further scheme according to a second preferred embodiment of the invention adopts the CFR's absolute value instead of its power as the CSI information, and assumes that the demapper has approximately the required linear property, namely, $$CSI_m(k) \sim |H_m(k)| \qquad (13)$$

The CSI-aided LS equalization may be represented as, $$CSI_k \hat{A}_m(k) = |H_m(k)| \frac{R_m(k)}{H_m(k)} = R_m(k) \arg[H_m(k)] \quad (14)$$

From Equation (14), it will be seen that this is an equivalent phase equalization as only the phase information of the channel estimation (CFR) is used in the equalization process. Variations in the amplitude of the CFR used in the equalization are counteracted in the CSI-aided Viterbi decoder.

The above analysis shows that, from the perspective of the COFDM system, the algorithms according to one or more preferred embodiments of the present invention are comparable to a conventional CSI aided Viterbi decoding algorithm in a COFDM system with BPSK/QPSK modulation, whilst from the viewpoint of pure frequency domain equalization, they are comparable to MMSE equalization. This point will be demonstrated by the following simulation results.

In the simulation, the proposed algorithms are verified using a practical channel estimator. Other system impairments such as frequency offset and phase noise are also included in the system simulation although they are not addressed in this invention.

Figure 5:
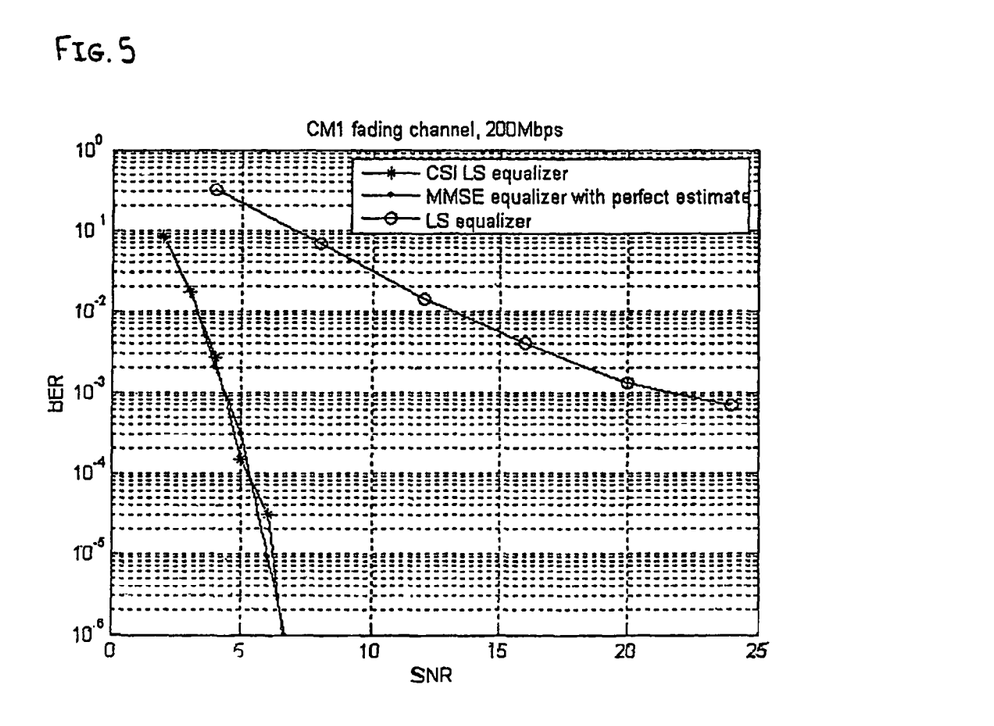
FIG. 5 is a graph showing a comparison of the bit error ratio (BER) against signal-to-noise ratio performance of CSI-aided LS equalization according to a first preferred embodiment of the present invention, a conventional equalization technique and an MMSE equalization technique.
Figure 6:
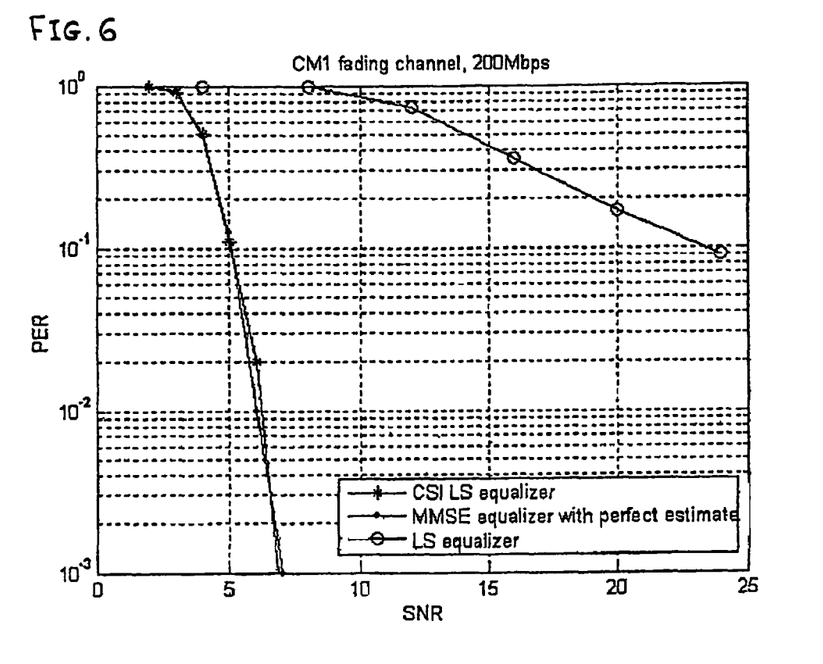
FIG. 6 is a graph showing a comparison of the packet error rate (PER) against signal-to-noise ratio performance of CSI-aided LS equalization according to the first preferred embodiment of the present invention, a conventional equalization technique and an MMSE equalization technique.

In the simulation, CM1 multipath fading channel provided by IEEE 802.15.3a is adopted (the details of which are described in the publication by J. Foerster and Intel R&D entitled "Channel Modeling Sub-committee Report Final. (doc.: IEEE P802.15-02/490r1-SG3a)," published as IEEE P802.15 Working Group for Wireless Personal Area Networks (WPANs), February. 2003 and available at: http:H/grouper.ieee.org/groups/802/15/pub/2003/Feb03/. There are 10 packets for each channel realization and 1000 packets in total are simulated for a specific SNR value. FIGS. 5 and 6 show the BER (bit error rate) and PER (packet error rate) curves under conventional LS equalization and CSI-aided equalization according to the first preferred embodiment of the invention. It will be seen that the performance of conventional LS equalization for a COFDM system is very poor. This is may be explained as follows. The conventional LS equalization in an OFDM system is a one-tap zero-forcing equalization based on the peak distortion criterion. It has the same problem as the linear equalizer, namely, noise enhancement, which will substantially degrade the performance of a COFDM system.

It is known that MMSE equalization can solve the problem of noise enhancement in a zero-forcing algorithm. Therefore, the performance of the MMSE equalization and the CSI-aided LS equalization methods according to the first preferred embodiment are also compared, and the BER and PER curve comparisons are also shown in FIGS. 5 and 6 respectively. It will be seen that, without any performance loss, the CSI-aided LS equalization according to the first preferred embodiment has comparable performance to the MMSE equalization but with much lower complexity. It is also superior to the conventional LS equalization method both in terms of complexity and performance.

Figure 7:
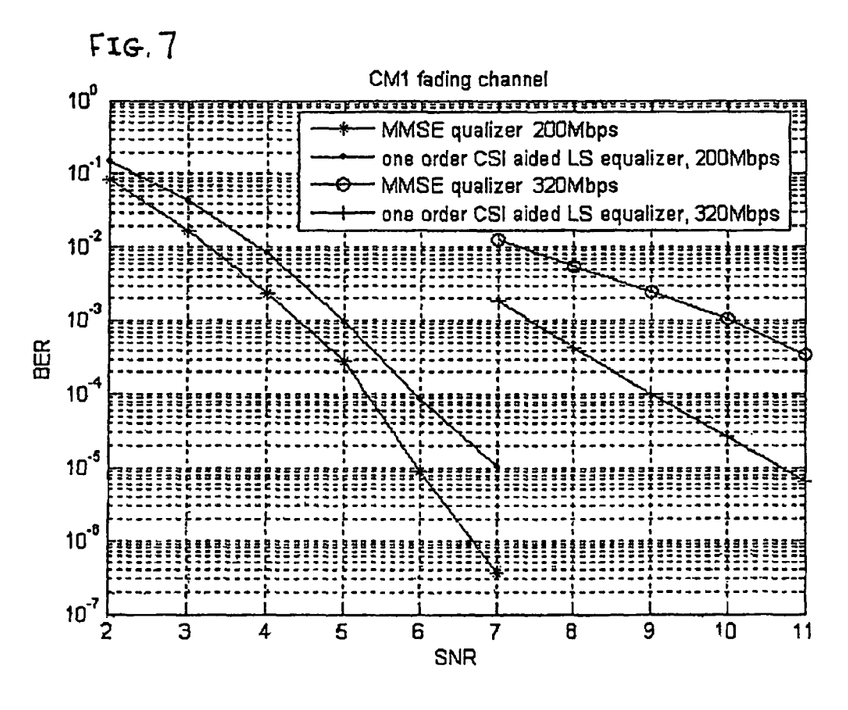
FIG. 7 is a graph showing a comparison of the bit error ratio (BER) against signal-to-noise ratio performance of CSI-aided LS equalization according to a second preferred embodiment of the present invention and an MMSE equalization technique.
Figure 8:
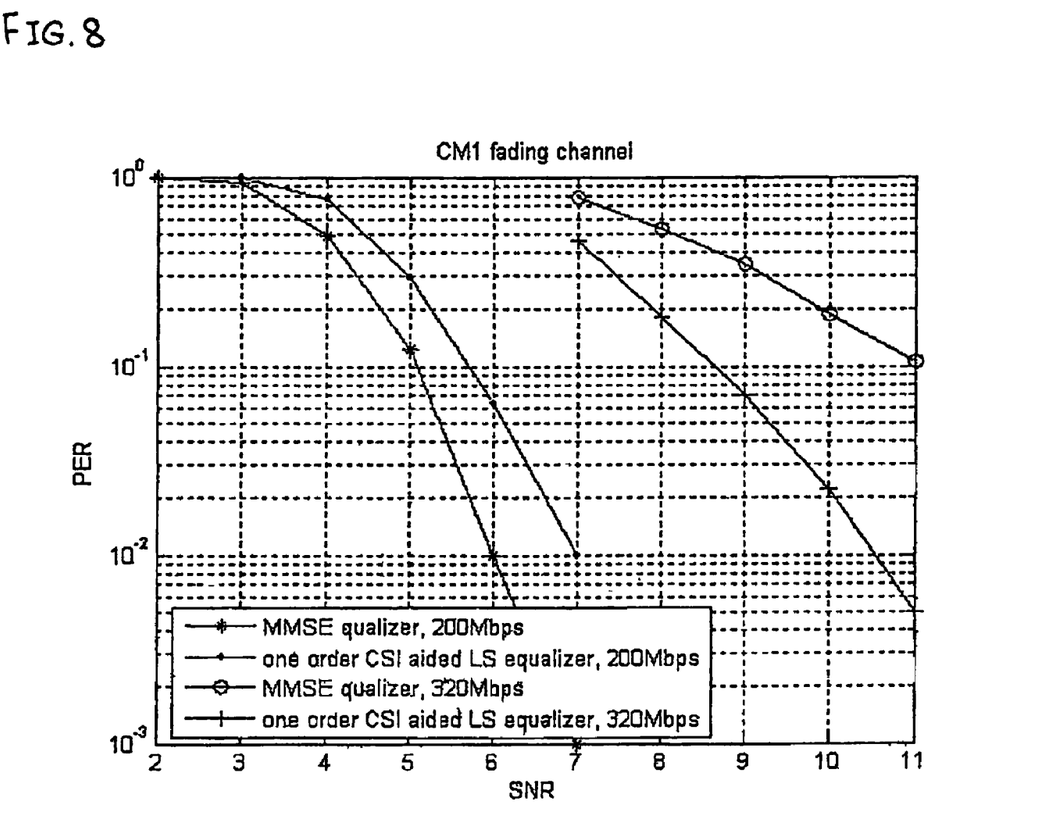
FIG. 8 is a graph showing a comparison of the packet error rate (PER) against signal-to-noise ratio performance of CSI-aided LS equalization according to the second preferred embodiment of the present invention and MMSE equalization.

The method according to a second preferred embodiment of the invention is also verified by the simulation. Its performance is compared with that of the MMSE equalization for two kinds of modulation scheme (data rate of 200 Mbps with QPSK modulation and 320 Mbps with DCM modulation). The obtained BER and PER curves are shown in FIGS. 7 and 8 respectively. When combined with the results shown in FIGS. 5 and 6, it will be seen that the second preferred embodiment method, although it has some performance degradation (0.5 dB to 1 dB) for QPSK modulation compared with the MMSE equalization (and the original CSI-aided LS equalization), may still achieve a large performance improvement over the conventional CSI aided Viterbi decoder. Moreover, the system and methods according to the second preferred embodiment may be generally applicable to numerous modulation schemes which do not have the special linear property present in BPSK/QPSK. The results shown in FIGS. 7 and 8 indicate that, for data rate of 320 Mbps with DCM modulation, the method according to the second preferred embodiment may achieve a better performance than the MMSE equalizer.

In summary, one or more preferred embodiments of the present invention provide a CSI aided least square (LS) equalization system and method which does not suffer from the problems of performance degradation and high implementation complexity present in a conventional CSI aided Viterbi decoder. In particular, in an embodiment of the invention, the combined reliability of the received bit may be obtained in the equalization stage instead of at the input of the Viterbi decoder and in the modified Euclidean branch metric, thus reducing the cost of the circuitry used to process the combined reliability. Moreover, the Viterbi decoder may take full advantage of the CSI. In addition to this, the complexity of LS equalization decreases substantially.

In conclusion, the systems and methods according to the present invention may be particularly useful in connection with devices for use as a receiver for a communication system.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the spirit and scope of the invention.

The invention claimed is:

1. A system for performing channel state information (CSI)-aided least square (LS) equalization on a signal in an OFDM system comprising:
    a receiver stage for receiving a modulated signal;
    a Fast Fourier Transform (FFT) demodulation stage for demodulating the received modulated signal to produce a FFT demodulated signal $R_m(k)$;
    a channel estimation stage for processing the FFT demodulated signal to provide an output signal corresponding to a channel frequency response (CFR) $H_m(k)$;
    an equalization stage arranged to process the output signal from the channel estimation stage to produce a CSI signal which is derived from the square of the CFR corresponding to the power of the CFR, the equalization stage being arranged to use the CFR to operate on the FFT demodulated signal from the demodulation stage to produce an LS equalized demodulated output signal $\hat{A}_m(k)$, wherein $\hat{A}_m(k) = R_m(k)/H_m(k)$, and further arranged to use the CSI signal to operate on each data sub-carrier of the LS equalized demodulated output signal to produce a CSI-aided LS equalized demodulated output signal $\overline{A}_m(k)$, wherein $\overline{A}_m(k) = CSI_k \cdot \hat{A}_m(k)$; and
    a decoding chain for decoding the CSI-aided LS equalized demodulated output signal, wherein the decoding chain includes a de-mapper stage for demapping the CSI-aided LS equalized demodulated output signal and wherein direct utilization of said CSI signal is completed prior to the decoding chain decoding and demapping the CSI-aided LS equalized demodulated output signal.

2. A system according to claim 1, wherein the decoding chain comprises a Viterbi decoder.

3. A system according to claim 1, wherein the demapper stage has a linear response.

4. A system according to claim 1, wherein the decoding chain has a linear response.

5. A receiver comprising the system of claim 1.

6. A transceiver comprising the system of claim 1.

7. A method for performing channel state information (CSI)-aided least square (LS) equalization on a signal in an OFDM system comprising:

receiving a modulated signal;

demodulating in a Fast Fourier Transform (FFT) stage the received modulated signal to produce a FFT demodulated signal $R_m(k)$;

processing in a channel estimation stage the FFT demodulated signal to provide an output signal corresponding to a channel frequency response (CFR) $H_m(k)$;

processing in an equalization stage the output signal from the channel estimation stage to produce a CSI signal $CSI_k$ which is derived from the square of the CFR corresponding to the power of the CFR;

operating on the FFT demodulated signal in the equalization stage using the CFR to produce an LS equalized demodulated output signal $\hat{A}_m(k)$, wherein $\hat{A}_m(k) = R_m(k)/H_m(k)$;

operating on each data sub-carrier of the LS equalized demodulated output signal in the equalization stage using the CSI signal to produce a CSI-aided LS equalized demodulated output signal $\overline{A}_m(k)$, wherein $\overline{A}_m(k) = CSI_k \cdot \hat{A}_m(k)$; and decoding in a decoding chain the CSI-aided LS equalized demodulated output signal, wherein the decoding includes demapping the CSI-aided LS equalized demodulated output signal and wherein direct utilization of said CSI signal is completed prior to the decoding and demapping.

8. A method according to claim 7, wherein the step of decoding comprises decoding using a Viterbi decoder.

9. A method according to claim 7, wherein the step of de-mapping comprises de-mapping using a de-mapper stage having a linear response.

10. A method according to claim 7, wherein the step of decoding comprises decoding in a decoding chain having a linear response.

* * * * *